United States Patent [19]

Shacher

[11] 4,345,581
[45] Aug. 24, 1982

[54] BOTTOM CONSTRUCTION OF PONDS PARTICULARLY SOLAR PONDS

[75] Inventor: Sraya Shacher, Ramat Gan, Israel

[73] Assignee: Solmat Systems Ltd., Jerusalem, Israel

[21] Appl. No.: 218,596

[22] Filed: Dec. 19, 1980

Related U.S. Application Data

[63] Continuation of Ser. No. 62,477, Jul. 31, 1979, abandoned.

[30] Foreign Application Priority Data

Nov. 1, 1978 [IL] Israel ..................................... 55479

[51] Int. Cl.$^3$ .......................... F24J 3/02; E02D 27/00
[52] U.S. Cl. .................................. 126/415; 52/169.7; 210/170; 405/53
[58] Field of Search ................. 126/415, 416; 405/53, 405/36; 165/45; 52/169.7; 4/495, 501, 507, 509; 203/DIG. 1; 159/15; 210/170, 165

[56] References Cited

U.S. PATENT DOCUMENTS

| | | | |
|---|---|---|---|
| 779,703 | 1/1905 | Gardner | 210/170 |
| 861,028 | 7/1907 | Grote | 210/170 |
| 2,984,050 | 5/1961 | Crooks | 52/169.7 |
| 3,152,640 | 10/1964 | Marx | 405/53 |
| 3,411,163 | 11/1968 | Myers | 126/415 |
| 3,415,022 | 12/1968 | Schaefer et al. | 52/169.7 |
| 3,660,957 | 5/1972 | Schankler | 52/169.7 |
| 3,854,291 | 12/1974 | Perkins | 210/170 |
| 4,039,451 | 8/1977 | Smith | 210/170 |
| 4,112,690 | 9/1978 | Hosoya | 52/169.7 |
| 4,178,039 | 12/1979 | Burton | 210/170 |

*Primary Examiner*—Daniel J. O'Connor
*Attorney, Agent, or Firm*—Benjamin J. Barish

[57] ABSTRACT

A pond construction, especially useful for non-convective solar ponds, having a multi-layer bottom in order to minimize seepage of liquid through the pond bottom. Liquid which permeates the multi-layer construction is pumped back into the pond.

10 Claims, 3 Drawing Figures

BOTTOM CONSTRUCTION OF PONDS PARTICULARLY SOLAR PONDS

This application is a continuation of Ser. No. 062,477, filed July 31, 1979, now abandoned.

BACKGROUND OF THE INVENTION

The present invention relates to the construction of ponds containing bodies of liquid, and particularly to the bottom construction of such ponds. The invention is especially useful in the construction of thermal ponds, particularly non-convective solar ponds, to prevent heat losses by seepage through the bottom, and therefore the invention is described below with respect to this application, but it will be appreciated that it could also advantageously be used in other types of thermal ponds, such as liquid storage ponds, to prevent liquid losses by seepage through the bottom.

Generally speaking, there are two types of solar ponds, namely solar evaporation ponds in which salt solutions are concentrated and/or salts are precipitated by the utilization of solar energy for the evaporation of the solvent water; and non-convection solar ponds, e.g. as described in Israel Pat. No. 12561 and U.S. Pat. No. 3,372,691, in which a vertically-extending salt concentration gradient is produced in the pond to produce a vertically-extending temperature gradient to enable the pond to act as a solar energy collector in which the concentrated solution at the bottom of the pond is heated to a high temperature, e.g. up to 100° C. and over.

One of the difficulties in the construction of solar ponds is the requirement for impermeability of the bottom of the pond. This requirement is considerably more stringent, and more difficult to fulfill, in non-convective solar ponds than in ordinary solar evaporation ponds or other thermal ponds, mainly because the bottom layer of the solution in a non-convective solar pond is considerably hotter, and therefore any seepage results in a loss of both concentrated solution and of energy. In addition, non-convective solar ponds use solutes which may be expensive salts whose loss by seepage substantially increases the cost in operating the pond.

Another difficulty experienced in non-convective solar ponds, particularly when the bottom is constructed of compacted earth, is the evolution of gases from below the bottom into the pond. This may occur when the bottom temperature reaches about 60° C., and is therefore particularly troublesome in non-convective solar ponds frequently operated at bottom temperatures of 100° C. and higher. This evolution of gases is probably caused by the disintegration of some components in the soil, the escape of air dissolved in ground water, and/or the expansion of gases in the soil. In any event, the evolution of these gases into the bottom of the pond tends to destroy the concentration gradient in the pond and to foul its water such that the pond may have to be abandoned.

In order to overcome the above difficulties, plastic covers (e.g., polyethylene, polyvinyl chloride), such as are used to seal water reservoirs and ponds, have been considered for use in the bottom of non-convective solar ponds, but these plastic covers deteriorate rapidly at the operating temperatures (up to 100° C. and above) at the bottom of the pond. Accordingly, expensive heat resistant materials (such as special heat-resistant plastic and metal sheets) have been used, but such materials are extremely expensive; moreover, even when they are used, it has been found that excessive seepage may still occur as a result of corrosion (if metal), aging, and imperfect joining of the plastic or metal sheets.

OBJECTS AND SUMMARY OF THE INVENTION

An object of the present invention is to provide an improved pond construction having advantages in the above respects.

According to a broad aspect of the present invention, there is provided a pond containing a body of liquid, characterized in that the pond comprises: a multi-layer bottom construction over the natural earth and including an upper layer relatively impermeable to the liquid in the pond, an intermediate layer highly permeable to the liquid in the pond, and a bottom layer relatively impermeable to the liquid in the pond; and pumping means for returning the liquid which permeates through the upper layer into the intermediate layer, back to the pond above the upper layer.

As mentioned above, the invention is particularly useful in thermal ponds, especially non-convective solar ponds, and is therefore described below with respect to that application.

In the preferred embodiment of the invention described below, the pumping means comprises: drainage piping located in the intermediate layer for receiving the liquid permeating through the upper layer, return piping communicating with the bottom of the pond above the upper layer, and a pump for pumping the permeating liquid from the drainage piping through the return piping back to the bottom of the pond above the upper layer.

According to further features included in the described preferred embodiment, the pump is located in a sump receiving liquid drained via the drainage piping. The sump is vented to the atmosphere to remove gases evolved at the bottom of the pond and drained therefrom to the sump before return of the drained liquid back to the bottom of the pond. Further, the sump is located laterally of the pond and includes a liquid level detector for automatically actuating the pump when the drained liquid in the sump exceeds a predetermined high level, and for automatically stopping the pump when the drained liquid drops below a predetermined low level.

In one described preferred embodiment, the impermeable upper and lower layers are both of compacted earth, and the permeable intermediate layer is of course sand and/or crushed stone.

A non-convective solar pond constructed in accordance with the foregoing features provides a number of important advantages: First, eventhough the bottom layer is not completely impermeable, there will be only negligible seepage through it since the pumping means, returning the liquid which permeates into the intermediate layer, prevents the building-up of pressure by the liquid overlying the bottom impermeable layer. In addition, the gases evolved at the bottom of the pond are vented to the atmosphere before the drained liquid is returned from the sump to the pond, and therefore the evolved gases cannot destroy the concentration gradient in the pond or foul its water. Further, the bottom construction of the solar pond can be made with relatively inexpensive materials (e.g., compacted earth for the impermeable layers and course sand and/or crushed stone for the permeable layer), thereby avoiding the need for expensive heat-resistant materials heretofore used.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figures 1, 3:
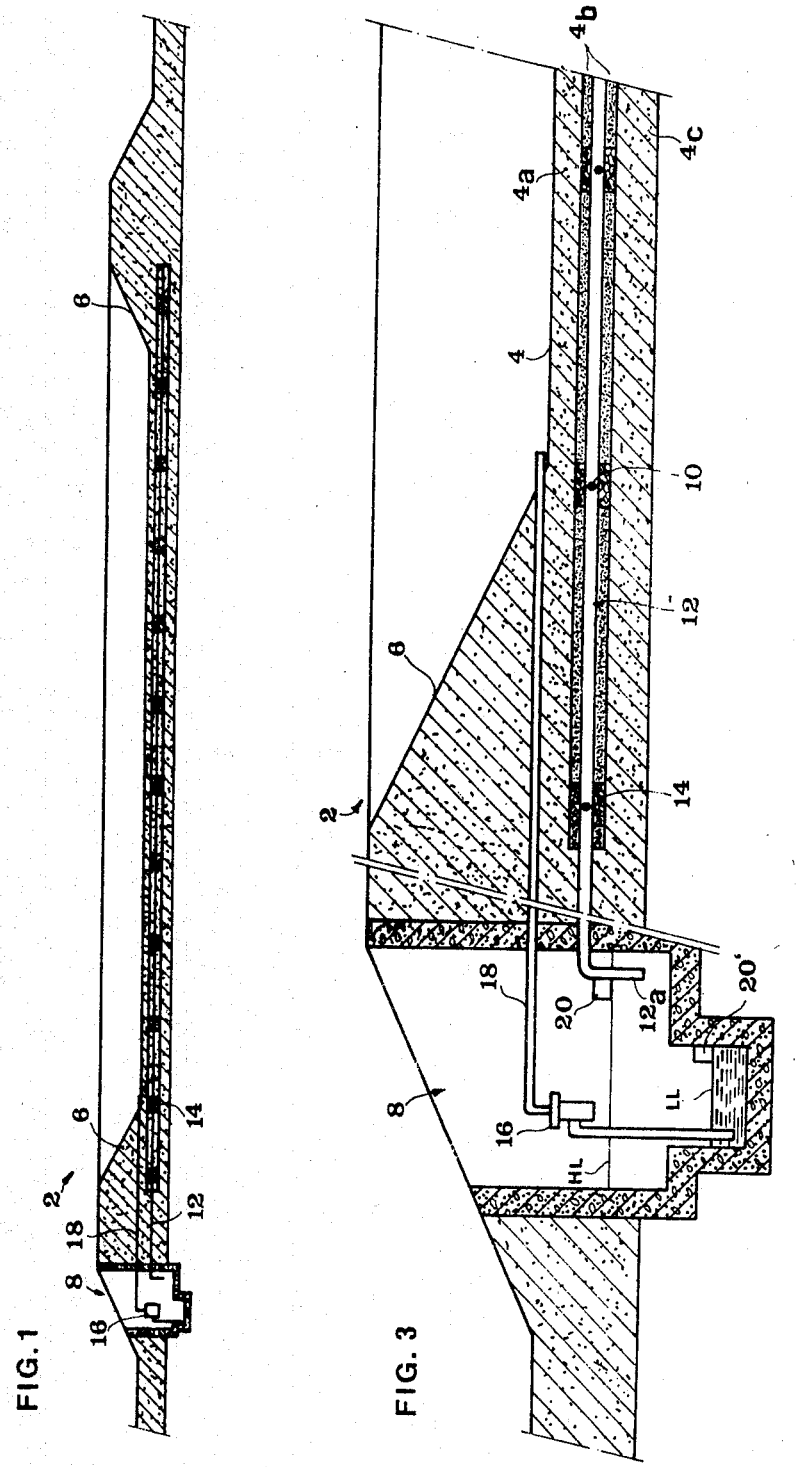
FIG. 1 is a side elevational view illustrating one form of non-convective solar pond constructed in accordance with the invention.
FIG. 3 is an enlarged sectional view of a portion of the solar pond of FIGS. 1 and 2 to illustrate details of its construction.

The non-convective solar pond illustrated in the drawings and therein designated generally by the reference numeral 2, is of rectangular configuration and is formed with a flat bottom 4 bordered by four sloping sides 6. A pit 8 is formed laterally of the pond which pit serves as a sump for receiving drainage from the bottom of the pond, as will be described more particularly below.

The pond bottom 4 over the natural earth is of a multi-layer construction more particularly illustrated in FIG. 3. It includes an upper layer 4a relatively impermeable to the liquid in the pond, an intermediate layer 4b highly permeable to the liquid in the pond, and a bottom layer 4c relatively impermeable to the liquid in the pond. As one example, the relatively impermeable upper layer 4a and bottom layer 4c may each be of compacted earth, whereas the highly permeable intermediate layer 4b may be of course sand and/or crushed stone.

Figure 2:
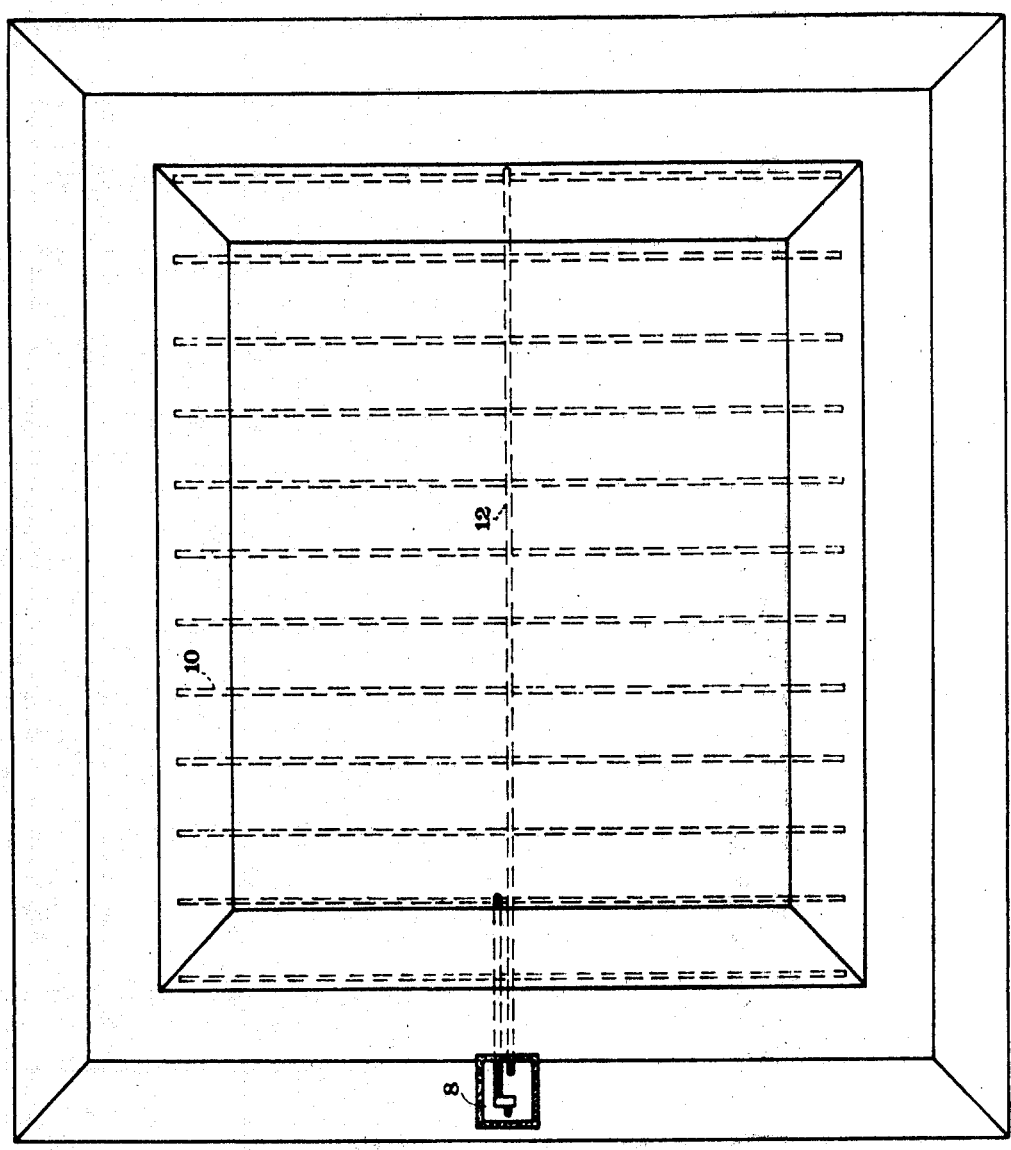
FIG. 2 is a top plan view of the solar pond of FIG. 1.

The highly permeable intermediate layer 4b is provided with drainage piping for receiving the liquid permeating through the upper layer 4a and for draining same to the sump 8. This drainage piping, as more particularly illustrated in FIG. 2, comprises a plurality of transversely extending drainage pipes 10 spaced longitudinally of the pond and joined to a longitudinally extending collection pipe 12 leading to the sump 8. As one example, the transverse drainage pipe 10 may be 3-inch asbestos-cement drainage pipes, and the longitudinal pipe may be 6-inch asbestos-cement drainage pipe. Preferably, the drainage pipes 10 and collection pipe 12 are laid within strips of crushed stone 14 (see FIG. 3).

The liquid permeating the upper layer 4a and reaching the intermediate layer 4b of the pond bottom is collected by pipes 10 and 12 and is permitted to drain via the outlet end 12a of pipe 12 into the bottom of sump 8. The sump includes a pump 16 which returns the drained liquid via a return pipe 18 to the bottom of the pond just above the upper layer 4a of the bottom construction.

Sump 8, preferably covered by a cover (not shown), is vented to the atmosphere so as to permit the escape of any gases evolved at the bottom of the pond structure. In addition, sump 8 includes a liquid level detector 20 for automatically actuating the pump when the liquid drained into the bottom of sump 8 exceeds a predetermined high level HL, and another detector 20' for automatically stopping the pump when it drops below a low level LL.

As one example, a solar pond was built of rectangular configuration having dimensions 35 M×30 M with the upper layer 4a and the bottom layer 4c of the pond bottom made of compacted earth having a permeability of about $10^{-5}$ to $10^{-6}$ cm/sec, the upper layer 4a being approximately 25 cm thick and the bottom layer 4c over the natural earth being approximately 40 cm thick. The intermediate layer 4b was of coarse sand 30 cm thick, and was crossed at 3.0 M intervals by 40 cm wide strips 14 of crushed stone in which 3-inch asbestos-cement drainage pipes 10 were laid. The drainage pipes 10 were all connected to a longitudinally-extending collection pipe 12 of 6-inch asbestos-cement also laid in a strip 14 of crushed stone. The pond side walls 6 were made of compacted earth having a slope of 1:2 to 1:3. The sump 8, into which the liquid drained via the outlet end 12a of the collection pipe 12 was a pit having epoxy-painted concrete walls.

The pond was filled to level of 2.0 M, and its level was recorded every day. As a control, the level in a small leak-proof control pond made of mild steel was also recorded every day. The volume of leakage from the pond was calculated as the pond surface area multiplied by the difference between the drop in liquid level in the large pond and the control pond, the liquid level drop in the control pond being due to evaporation only.

In the first few days, water loss due to leakage was observed at the rate of 6 to 10 mm per day, and only small quantities of water accumulated in the drain sump 8. However, after a few days, these quantities increased and the pump 16 started to operate. After 20 days, no more leakage losses could be observed. The fact that water leaking through the upper layer of the bottom of the pond in the first few days did not drain into the sump is probably explained by the fact that the intermediate layer 4b, which was originally dry, had to be first soaked to capacity before additional water could drain into the sump 8.

It will be appreciated that in the foregoing construction, the intermediate layer 4b of the pond bottom serves the plural function of: collecting the seepage through the upper layer 4a of the pond; preventing the build-up of liquid pressure on the bottom layer 4c of the pond; and allowing the escape of any gases which may accumulate under the bottom of the pond as the temperature rises. The latter gases are passed to the sump 8 with the drained liquid and are vented to the atmosphere before the drained liquid is returned by pump 16 to the bottom of the pond above the upper layer 4a. Preferably, therefore, the thickness of the upper layer 4a, when made of compacted earth, should not be excessive so that any gases formed in it may escape through the intermediate layer 4b. Generally speaking, it is preferred to have the upper layer 4a of a thickness less than that of the intermediate layer 4b, and the intermediate layer 4b of a thickness less than that of the lower layer 4c, which is the case in the above-described example.

In a variation, another pond having the dimensions 50 M×30 M was constructed as described above except that the upper layer 4a, as well as the pond vertical walls 6, were made of 1.5 mm thick mild steel sheets painted with an anti-corrosion black paint. As a result, the pond continued to be serviceable although a considerable number of leaks did develop through the bottom, as proved by the accumulation of considerable amounts of water in the sump.

While the invention has been described with respect to non-convection solar ponds, it will be appreciated that it could be used with advantage in other types of ponds, for example solar evaporation ponds, thermal ponds used for storing waste or surplus heat from industrial operations such as power stations, and liquid storage ponds to prevent liquid losses by seepage through the pond bottom. Many other variations, modifications and applications of the invention will be apparent.

What is claimed is:

1. A pond containing a body of liquid, characterized in that, in order to minimize seepage of the liquid through the pond bottom, the pond comprises a multi-layer bottom construction over the natural earth and underlying the complete pond, which bottom construction includes an upper layer of a permeable material having a low degree of permeability to the liquid in the pond, an intermediate layer of a permeable material having a high degree of permeability to the liquid in the pond, and a bottom layer of a permeable material having a low degree of permeability to the liquid in the pond; and pumping means for returning the liquid which permeates through the upper layer into the intermediate layer, back to the pond above the upper layer.

2. A pond according to claim 1, wherein the pond is a thermal pond containing a heated liquid.

3. A pond according to claim 2, wherein the pond is a non-convective solar pond containing a body of liquid to be heated by solar radiations.

4. A pond according to claim 1, wherein said pumping means comprises drainage piping located in said intermediate layer for receiving the liquid permeating through the upper layer, return piping communicating with the bottom of the pond above the upper layer, and a pump for pumping said permeating liquid from the drainage piping through the return piping back to the bottom of the pond above the upper layer.

5. A pond according to claim 4, wherein said pump is located in a sump receiving liquid drained via the drainage piping.

6. A pond according to claim 5, wherein said sump is vented to the atmosphere to remove gases evolved below the bottom of the pond and passed therefrom to the sump before return of the drained liquid back to the bottom of the pond.

7. A pond according to claim 1, wherein said pumping means is located laterally of the pond and includes a liquid level detector for automatically actuating the pumping means when the drained liquid in the sump exceeds a predetermined high level and for automatically stopping the pumping means when the drained liquid drops below a predetermined low level.

8. A pond according to claim 1, wherein the impermeable upper layer has a thickness less than that of the permeable intermediate layer, and wherein the latter layer has a thickness less than that of the impermeable lower layer.

9. A pond according to claim 1, wherein the upper and lower layers have a permeability of about $10^{-5}$ to $10^{-6}$ cm/sec.

10. A pond according to claim 1, wherein said drainage piping comprises a plurality of transversely extending drainage pipes spaced longitudinally of the pond and joined to a further collection pipe extending longitudinally of the pond and leading to said sump.

* * * * *